Sept. 9, 1947.   C. W. HOPKINS ET AL   2,427,283
CENTERLESS GRINDING MACHINE
Filed Oct. 4, 1944   8 Sheets-Sheet 3

Inventors
Cecil W. Hopkins and
Edwin M. Eigenbrode,
By Strauch & Hoffman
Attorneys Sept. 9, 1947.  C. W. HOPKINS ET AL  2,427,283
CENTERLESS GRINDING MACHINE
Filed Oct. 4, 1944  8 Sheets-Sheet 7

Inventors
Cecil W. Hopkins and
Edwin M. Eigenbrode,

Strauch & Hoffman
Attorneys

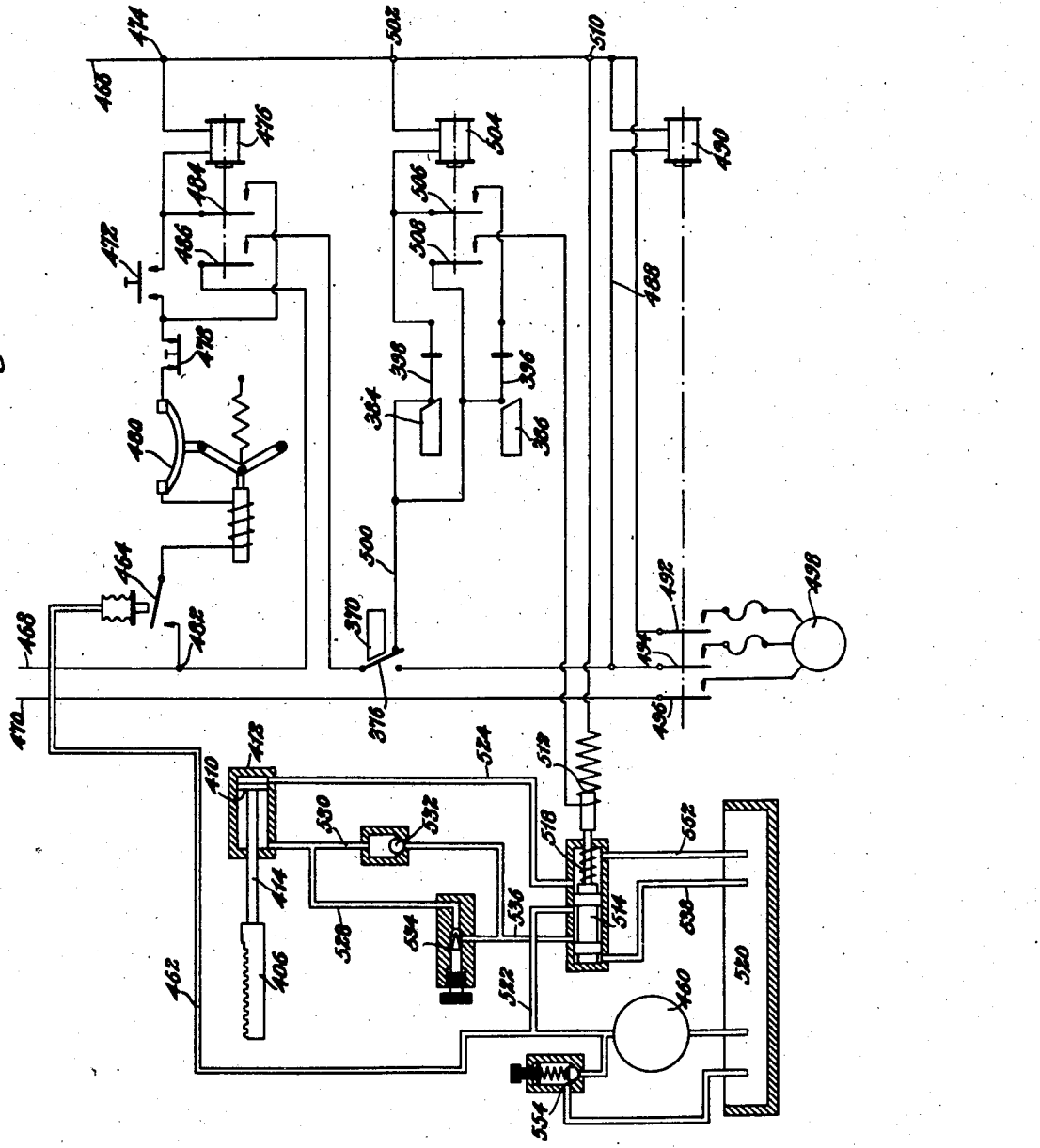

Patented Sept. 9, 1947

2,427,283

UNITED STATES PATENT OFFICE 2,427,283

CENTERLESS GRINDING MACHINE

Cecil W. Hopkins and Edwin M. Eigenbrode, Waynesboro, Pa., assignors to Landis Machine Company, Waynesboro, Pa., a corporation of Pennsylvania Application October 4, 1944, Serial No. 557,128

24 Claims. (Cl. 51—103)

1

This invention relates to centerless grinding machines and has for its general object and purpose to provide certain important improvements in the machine shown in the pending application of Arthur Scrivener, Serial No. 556,426, filed September 29, 1944. While this machine and the present improvements are adaptable for the grinding of numerous different kinds of work pieces, they are more particularly designed for application and use in the grinding of preformed threads on work pieces of various diameters, wherein the rotation of the work piece upon a work support in contact with the peripheral surface of the abrading or grinding wheel is governed by a control wheel which also performs certain feeding and ejecting functions. A machine of this general character is disclosed in Patent No. 2,091,655.

In the machine disclosed in the pending application above referred to there is provided an oscillatory control wheel having circumferentially spaced work receiving and discharging pockets with peripheral surface sections between said pockets of relatively different lengths. The wheel pockets which receive work pieces of different sizes are adapted to be selectively positioned with respect to a work rest or support and the control wheel is manually oscillated in one direction to urge the work piece on the support against the face of the grinding wheel and retard rotation thereof, the effective rotation of said work piece being limited by the length of the particular selected peripheral surface section extending between the adjacent pockets. After the discharge of the work piece from the following pocket of the control wheel, the oscillation of said wheel is manually reversed to return the work receiving pocket to starting position.

It is the principal object of our present invention to provide automatic means for oscillating the work control wheel in each direction and controlling the extent of such oscillatory motions of the wheel in accordance with the diameter of the particular work piece so that such work pieces will be uniformly and accurately ground to the same finished diameter.

Another object of the invention is to provide such an automatic operating means for the work control wheel which embodies relatively adjustable parts for predetermining the extent or degree of oscillatory motion of said wheel in accordance with the diameters of work pieces of different sizes.

It is a further object of the invention in one embodiment thereof to provide automatic operating means for the control wheel of a centerless grinding machine as above characterized, in which the reversible oscillating motions of the control wheel are electrically controlled.

A still further object of the invention is to provide such an electrical control system wherein means is provided for oscillating the work control wheel either at a slow grinding speed or for rapidly rotating said wheel in one direction for the purpose of truing or dressing its peripheral surface.

A still further object of the invention in another embodiment thereof is to provide hydraulically actuated means for operating the work control wheel together with an electrical control system for the hydraulic medium.

In connection with the latter embodiment of the invention, another object thereof is to provide means for utilizing said electrical control system for the interchangeable operation of said hydraulically actuated means to cause a slow oscillating grinding motion of the control wheel, or for the operation of a motor to continuously drive the control wheel at high speed when truing or dressing its peripheral surface.

It is also the aim and purpose of our present invention to provide a centerless grinding machine having the several novel features above referred to, which, nevertheless comprises a very compact assembly of structurally simple cooperating elements which will be highly efficient in functional operation as well as rugged and durable, so that maintenance expense will be reduced to a minimum.

With the foregoing and other subordinate objects in view, the invention comprises the improved centerless grinding machine and the construction and relative arrangement of its several parts as will be hereinafter more fully described, illustrated in the accompanying drawings and subsequently incorporated in the subjoined claims.

In the drawings, wherein like reference characters designate corresponding parts throughout the several views and in which we have shown several simple and practical embodiments of our invention:

Figure 7:
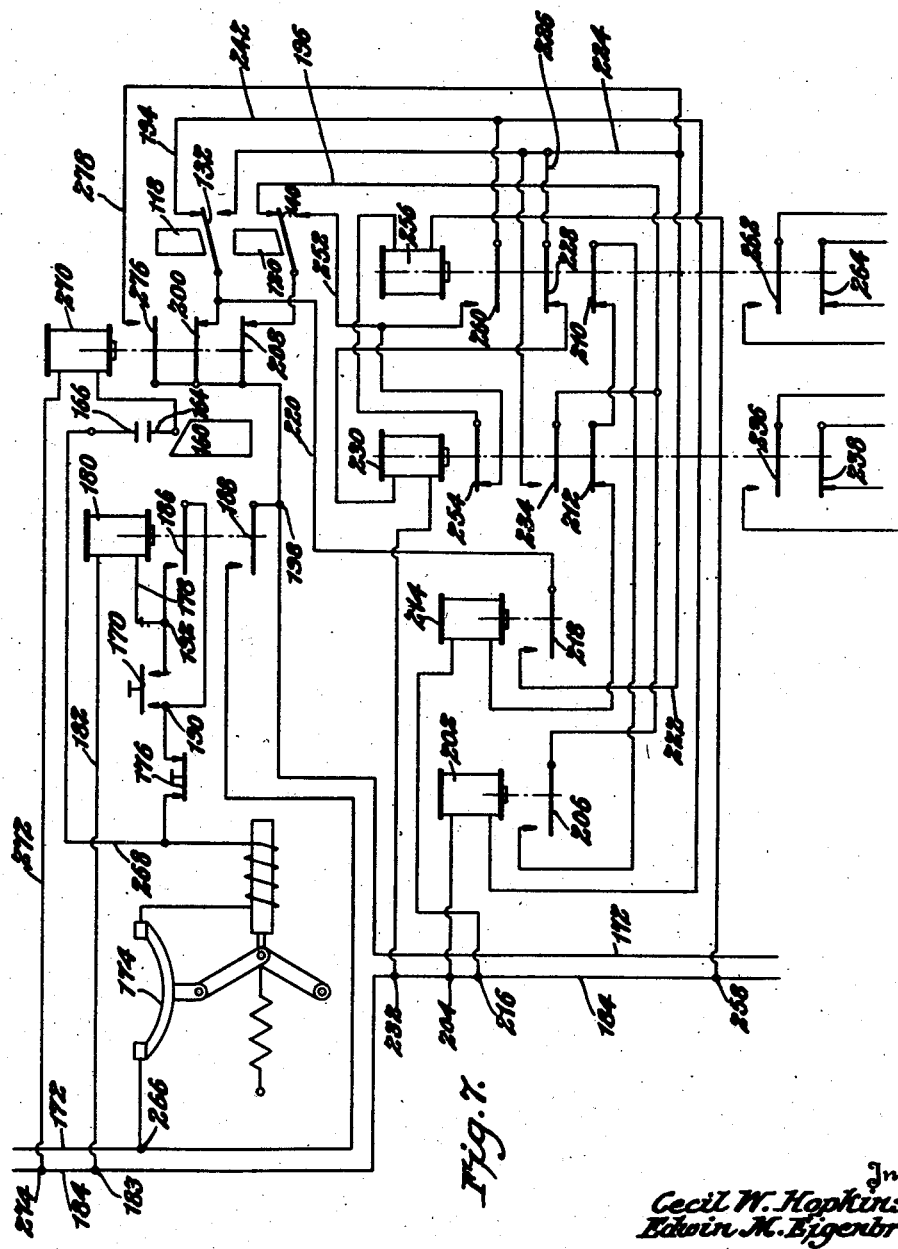
Figure 8:
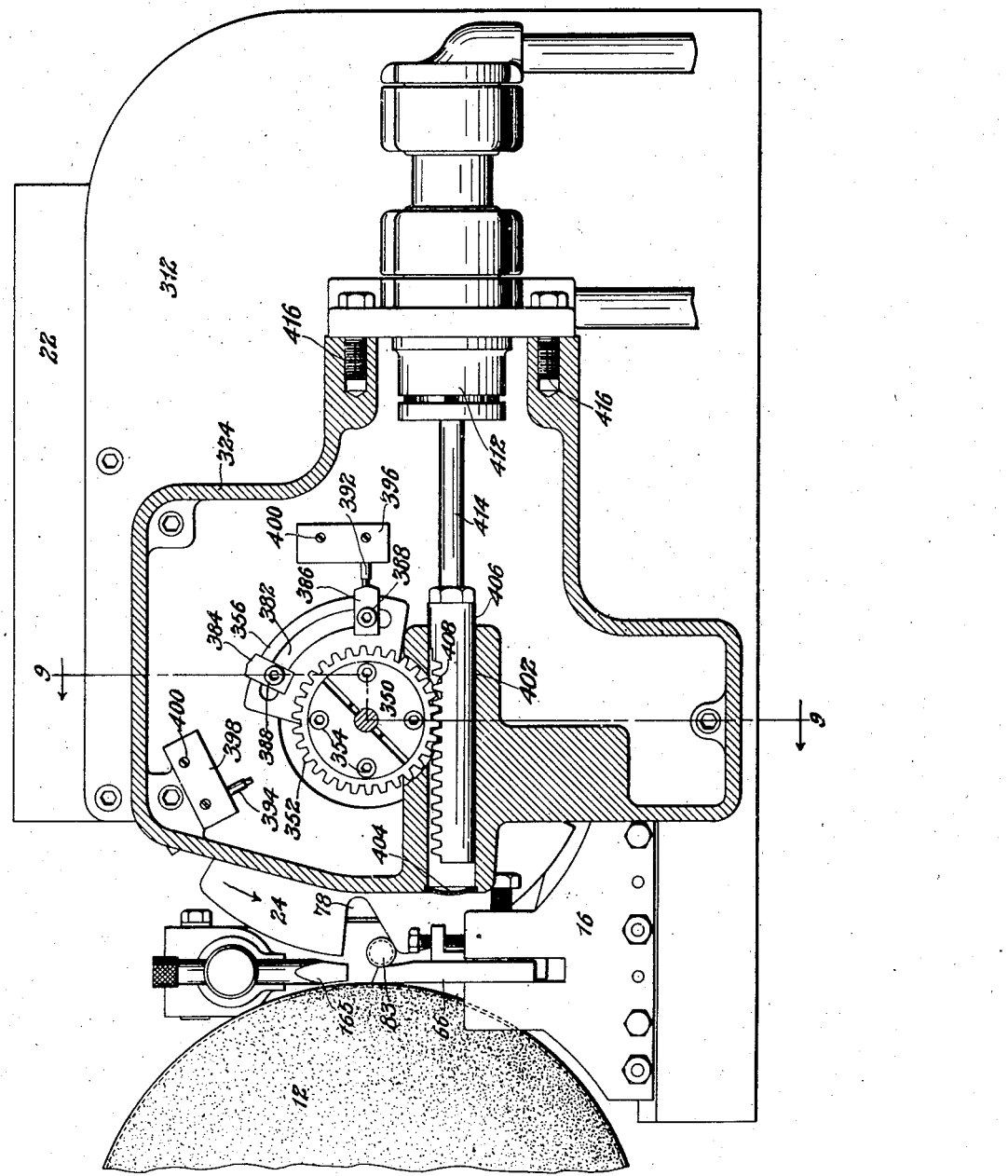
Figure 9:
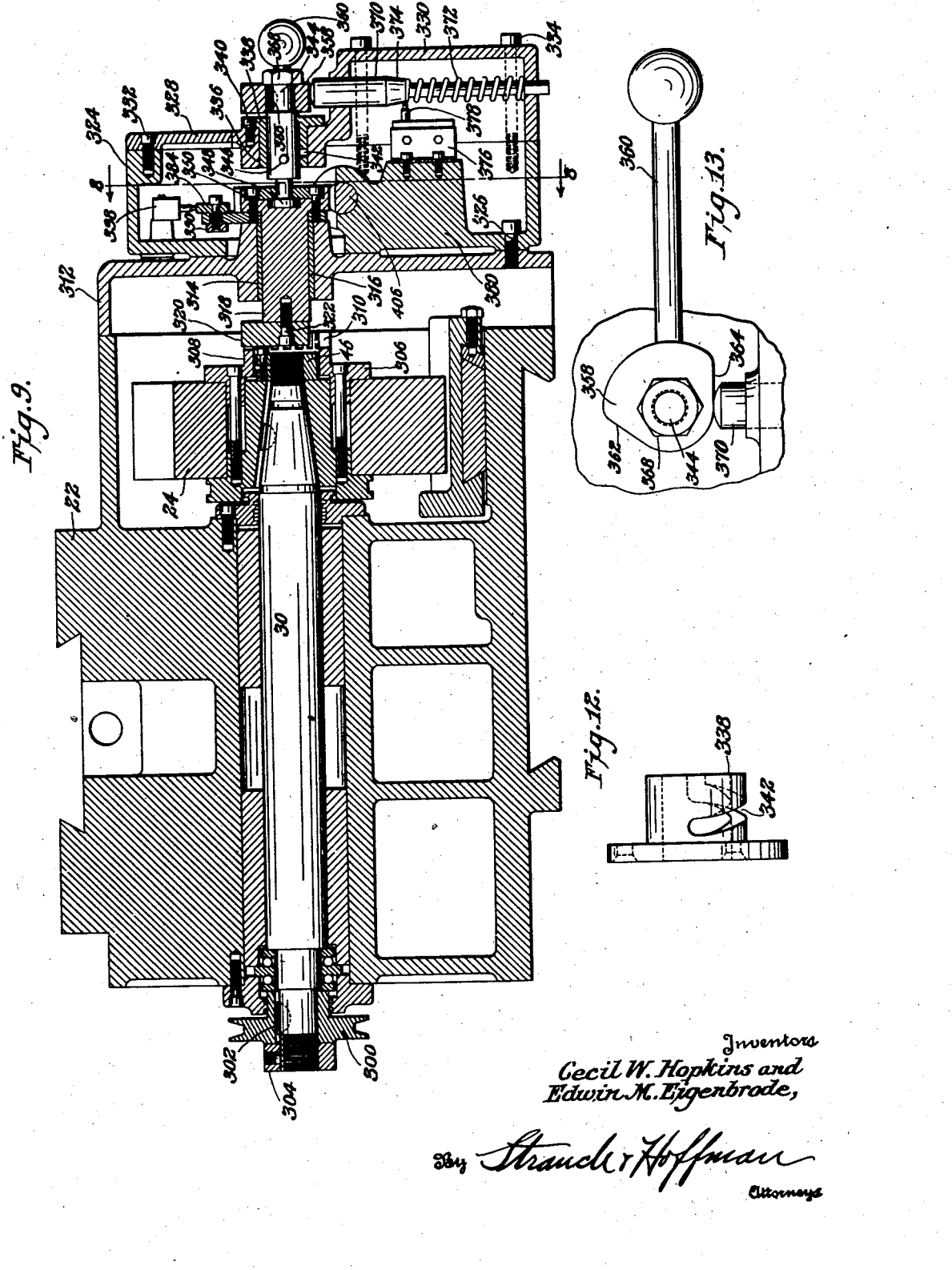
Figure 10:
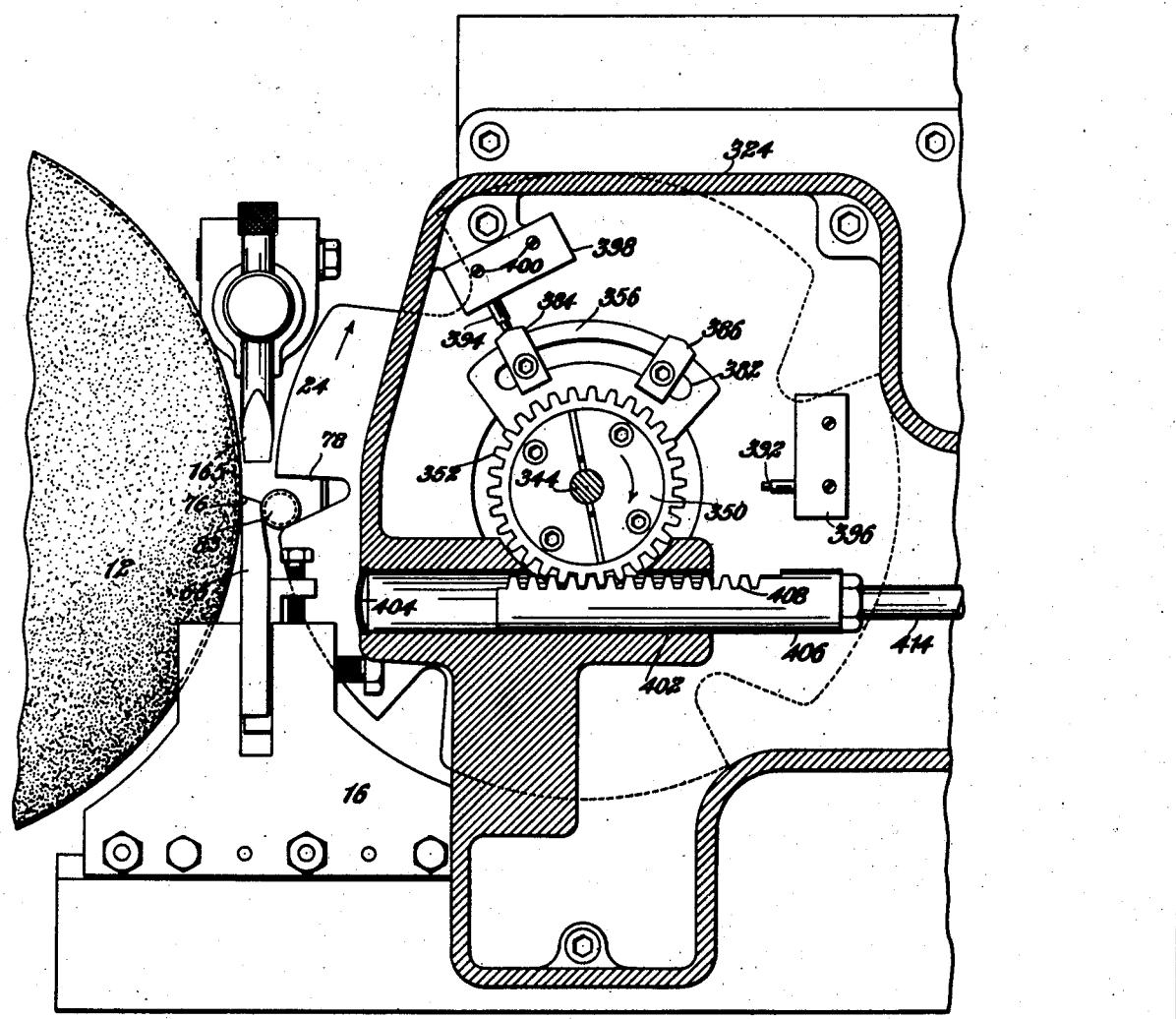

Figure 7 diagrammatically illustrates the electrical control circuits for the control wheel operating motor;

Figure 8 is a longitudinal sectional view taken substantially on the line 8—8 of Figure 9, illustrating a modified embodiment of the invention, the parts being shown in position for the discharge of a ground or finished work piece;

Figure 9 is a transverse sectional view taken substantially on the line 9—9 of Figure 8;

Figure 10 is a vertical sectional view similar to Figure 8 and showing the work piece being fed to grinding position on the work rest;

Figure 11 is a diagrammatic view illustrating the hydraulic and electrical control circuits for the operation of the work control wheel;

Figure 12 is a detail side elevation of the clutch operating cam; and

Figure 13 is a detail elevation of the actuating means for the movable clutch element and the motor control switch operating cam.

Figure 1:
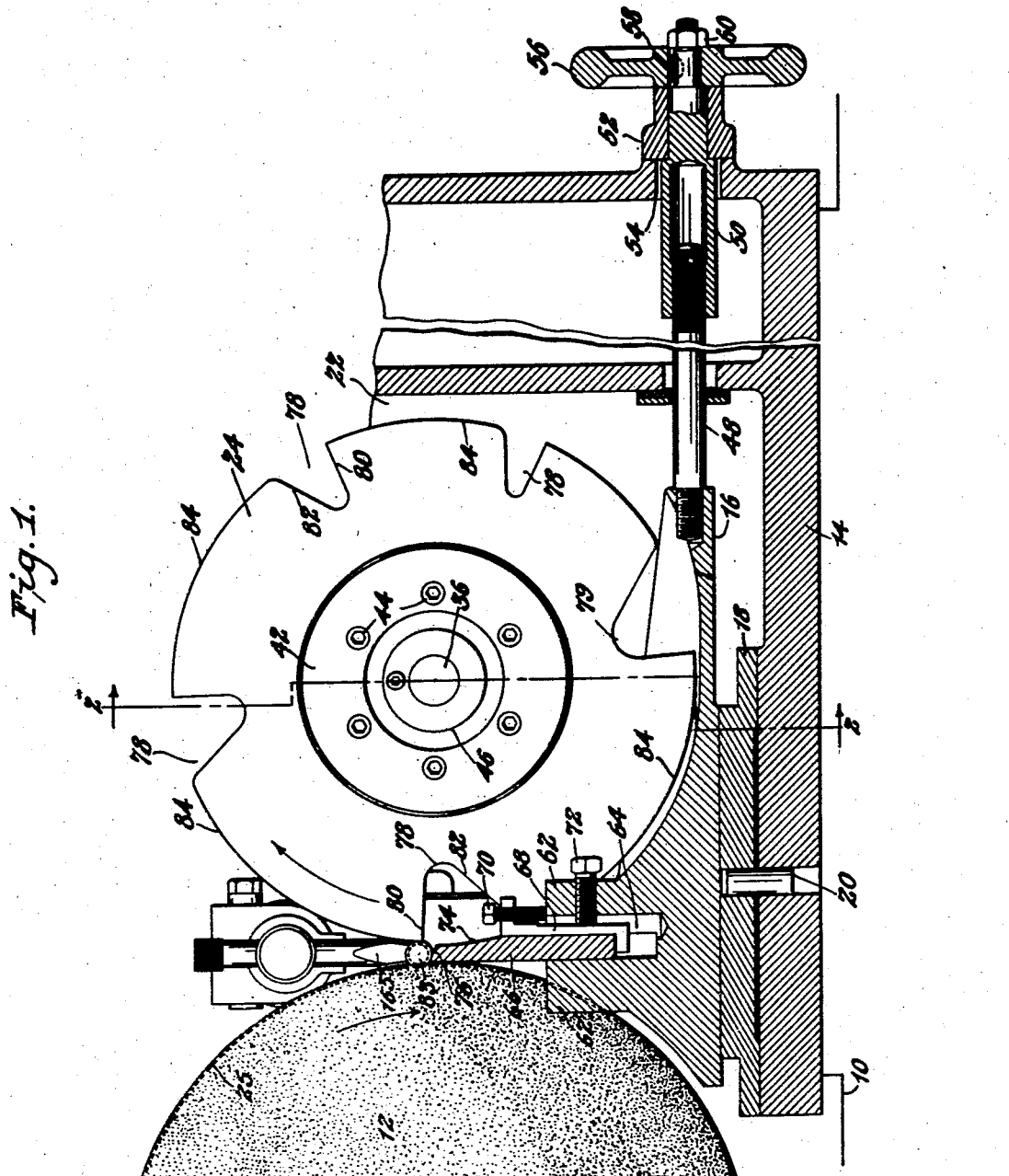
Figure 1 is a longitudinal sectional view of a centerless grinding machine, taken substantially on the line 1—1 of Figure 2.

Referring for the present more particularly to the embodiment of the invention shown in Figures 1 to 7 of the drawings, in Figure 1 there is illustrated a portion of the machine base 10 upon which the usual grinding head (not shown) is mounted. The grinding wheel 12 is suitably mounted on said head for continuous rotation at relatively high speed. The main control wheel supporting slide 14 is mounted on the machine base 10 and on this slide the work rest slide 16 is mounted by means of the usual dovetail connection with the plate 18 which is connected with the slide 14 by the vertical pin 20.

Figure 2:
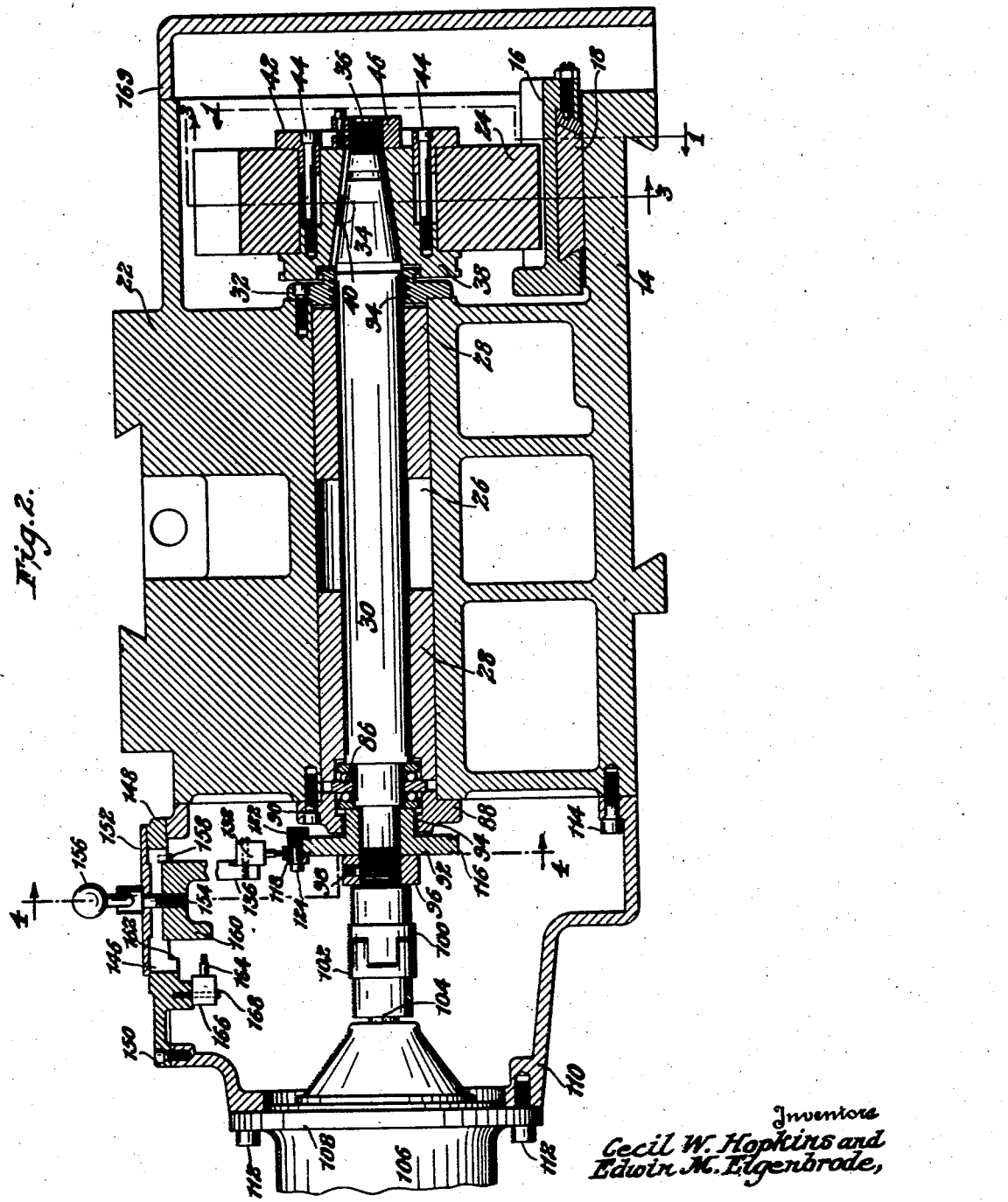
Figure 2 is a transverse sectional view taken substantially on the line 2—2 of Figure 1.

The slide 14 is preferably integrally formed with the control wheel head 22 in which the control wheel 24 is mounted, in the manner to be presently explained, in opposed peripheral relation to the grinding wheel 12. As shown in Figure 2 the control head 22 is provided with a transverse cylindrical bore 26 having a bushing 28 in each end thereof in which the control wheel shaft or spindle 30 is journalled. The forward end of the bore 26 is sealed by means of the cap member 32 to exclude cooling medium, grinding dust or other foreign matter. Forwardly of the cap plate 32, the spindle 30 is formed with a sharply tapered section 34 and terminates in a threaded portion 36 of reduced diameter. A flanged sleeve 38 is keyed to the tapered portion 34 of the spindle 30 as shown at 40. The sleeve 38 is adapted to be fitted within a central circular opening in the control wheel 24 with the end flange of said sleeve abutting against one side face of the wheel. A flanged collar 42 is telescoped upon the other end of the sleeve 38, the flange of said collar abutting the opposite side face of wheel 24. The collar and sleeve are connected by the tie rods or bolts 44 whereby the flanges of said collar and sleeve are secured in tight clamping contact against the opposite side faces of the control wheel. Axial movement of said sleeve and collar relative to the spindle end 34 is prevented by means of the lock nut 46 threaded upon the terminal 36 of said spindle into tight abutting contact against the front end of the sleeve 38.

Referring again to Figure 1, the slide 16 for the work rest or support has a longitudinal extension channeled or grooved to accommodate the lower portion of the control wheel 24, and one end of the rod 48 has a threaded connection with this slide extension. The other end of this rod is threaded into a tubular end portion of the shaft 50 which is rotatably supported in a bracket 52 suitably secured to one side of the control head 22, said shaft extending inwardly therefrom through an opening 54 in the wall of said control head. To the other end of the shaft 50 the hand wheel 56 is fixed by means of the key 58 and lock nut 60. It will therefore be evident that upon operation of the hand wheel 56 longitudinal movement is imparted to the slide 16 relative to the control head 22 and the slide 14.

The slide 16 is formed with spaced vertical portions 62 at each side of the wheels 12 and 24, each of said portions 62 having a central vertical slot 64 therein. In these slots the work rest 66 is supported upon the lower ends of brackets 68. These brackets may be vertically adjusted relative to the parts 62 of the slide by means of screws 70 while the screw 72 threaded in each of the parts 62 engages the respective brackets to securely clamp and hold said brackets and the work rest 66 against lateral movement. Above the brackets 68, the side face of the work rest 66 is of concave arcuate form as shown at 74 and substantially concentric with the peripheral surface of the control wheel 24. The top work receiving surface of the work rest 66 is transversely inclined downwardly towards the control wheel 24, as shown at 76.

The control wheel 24 is formed with a plurality of nonequidistantly, circumferentially spaced, work receiving pockets 78 each of which has one edge face 80 disposed in substantially radial relation to the wheel 24 while the opposite edge face thereof is obliquely inclined as shown at 82. These work receiving pockets function to deliver the work piece 83 to the upper surface of the work rest 66 as well as to receive the finished work piece and effect its discharge from the machine, as will be more fully later described. It will be noted that this arrangement of the work receiving pockets provide curvilinear peripheral surface sections 84 on the control wheel of relatively different lengths. However, it will be understood that in operating constantly on work pieces of one size, these surfaces may be of the same length and the pockets equidistantly spaced apart.

From reference to Figure 1 it will be seen that in the high speed rotation of grinding wheel 12 in clockwise direction, the work piece is rotated in counterclockwise direction on the work rest 66. In the rotation of control wheel 24 in counterclockwise direction at relatively slow speed, the selected peripheral surface 84 thereof urges the work against the face of the grinding wheel and also has a retarding or braking action which reduces the peripheral speed of rotation of the work piece, resulting in an effective grinding action by the wheel 12. Since the area of the surface to be ground and the speed of rotation of the work piece varies with the diameter of the work piece, the length of the surfaces 84 of the control wheel is accurately calculated so that by selecting the appropriate work control surface of the wheel 24 work pieces of different sizes or diameters will rotate for the same degree and at relatively low surface speed on the work rest 66, against the face of the grinding wheel 12.

As thus far described, the machine is substantially of the same construction as that disclosed in the co-pending application above-identified.

Referring more particularly to Figure 2, it will be noted that the control wheel spindle or shaft 30 has a rear end portion of reduced diameter upon which the thrust bearing 86 is mounted. The bearing and spindle are held in correct coaxial relation by means of the retaining cap member 88 secured to the control head 22 by the screws indicated at 90. A wheel or disk 92, rearwardly of the member 88 has a hub portion on the shaft 30 contacting the bearing 86. Preferably, the member 88, as well as the member 32, is provided with internal grooves to receive suitable sealing rings 94 of felt or other suitable material for retention of lubricant and the exclusion of dirt. The wheel or disk 92 is retained in fixed position on the end of the shaft 30 by means of the lock nut 96 threaded on said shaft and locked thereto by means of the screw 98. Upon the extremity of the shaft 30, one member 100 of a jaw clutch or coupling is rigidly fixed by any conventional means and cooperates with a similar coupling member 102 fixed to the end of the motor shaft 104. This coupling transmits power to the control wheel operating shaft 30 from a direct current motor 106 the frame of which has an end flange 108 securely fixed to the housing 110 by means of screws 112. This housing in turn is rigidly attached to the control head 22 by the screws indicated at 114.

Figure 4:
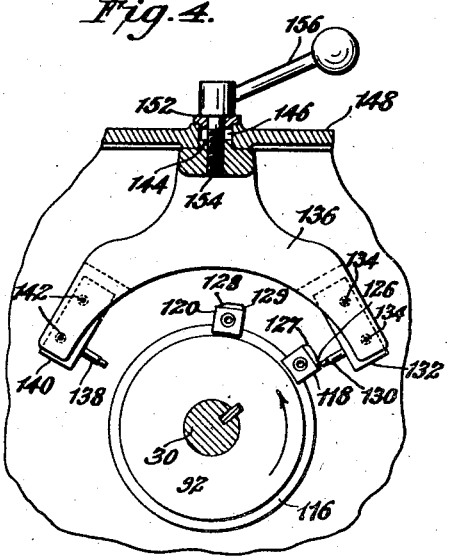
Figure 4 is a fragmentary sectional view taken substantially on the line 4—4 of Figure 2, with the parts positioned correspondingly to Figure 3.
Figure 5:
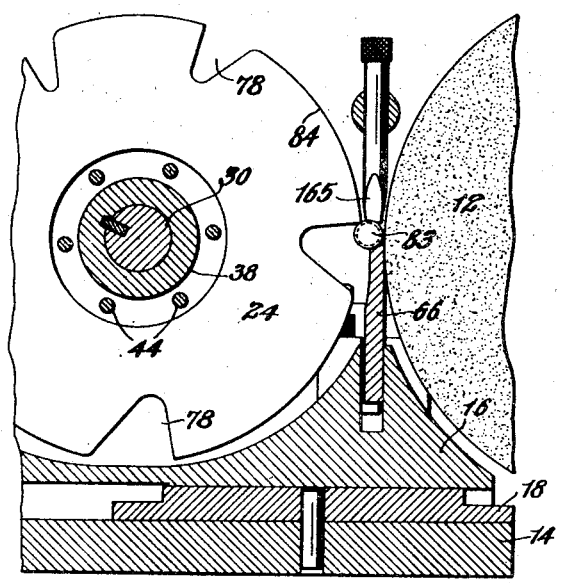
Figure 5 is a fragmentary sectional view similar to Figure 3, with the parts arranged to discharge a work piece from the grinding position.

Upon reference to Figures 2 and 4 of the drawings, it will be noted that the disk or wheel 92 is provided upon its periphery with a circumferentially continuous portion 116 of dovetail form in cross-section. This dovetail peripheral portion of the disk forms a slideway for the relatively adjustable cam members 118 and 120, respectively. Each of these members has an undercut groove to engage one side of the dovetail 116. A similarly grooved clamping member 122 associated with each of the cam members engages the opposite side face of said dovetail, said members being adjusted to clamping position by means of the screws 124 mounted in the respective cam members. Thus by loosening said screws the cam members may be relatively adjusted circumferentially of the wheel 92 and then rigidly fixed in such adjusted positions thereon. At its outer end the member 118 has an inclined camming surface 126 and the member 120 has a similar camming surface 128 but inclined in the reverse direction to the surface 126 on the cam member 118. Each cam member is also provided with a relatively short camming surface 127 and 129, respectively, inclined in a reverse direction to the respective cam surfaces 126 and 128.

The camming surface 126 of member 118 is inclined towards the actuating member or plunger 130 of a switch 132 secured by the screws 134 to one end of a yoke-shaped bracket 136 while the camming surface 128 of the member 120 is inclined in the opposite direction toward the actuating member or plunger 138 of the switch 140 secured to the other end of the bracket 136 by screws 142. Thus the cams 118 and 120 may be relatively positioned for the properly timed actuation of the switches 132 and 140, respectively, controlling the operation of motor 106 in opposite directions for the alternate oscillation of the control wheel 24 in one direction to grind the work piece and in the reverse direction to discharge the finished work piece from the machine.

The bracket 136 is centrally formed with an upwardly extending part having a horizontal portion formed on its upper surface with a rib 144 slidably engaged in the slot 146 of the cover or closure plate 148 secured by means of screws 150 over an access opening in the top wall of the housing 110. The upper side of the slot 146 is closed by the plate 152 in which a clamping screw 154 is rotatably mounted and has a threaded connection with the bracket 136. By rotation of the operating handle 156 for the screw 154, the bracket 136 may either be rigidly clamped in a fixed position relative to the cover plate 148, or released and adjusted longitudinally of the slot 146, the plate 152 sliding upon the surface of the cover in such adjustment of the bracket member. Adjustment of the bracket in the forward direction is limited by the pin 158 fixed in the cover 148 while the rearward adjustment of said bracket is limited by contact of the lug 160 on the bracket arm with the shoulder 162 formed on the cover 148 adjacent one end of the slot 146. In the adjustment of the bracket to the latter position, the switch actuating elements 130 and 138 are displaced out of the path of movement of the cam members 118 and 120 and the bracket lug 160 engages and actuates the operating member or plunger 164 of a switch 166 which is mounted on the housing cover 148 by means of the screws 168. As will be later explained, this switch closes a control circuit for the motor 106 to rotate the control wheel 24 at high speed in one direction during the truing or dressing operation.

While our invention may be advantageously employed for the grinding of work pieces of many different kinds to be used for a variety of purposes, it is especially designed for high precision grinding, such as the finish grinding of roughly pre-formed screw threads of bolts or the like, where thread concentricity, helix angle, pitch and final diameter are factors of major importance.

Therefore, in the present instance, we have shown a work locating finger 165 mounted above and in vertical alignment with the work rest 66 to engage the pre-formed threads on the work piece 83 and introduce the same in proper relation to the peripheral ribs on the grinding wheel 12, indicated at 25, which are of similar profile form. As the mounting and arrangement of the work locating finger is fully described in Patent No. 2,091,655 above referred to, it will not be herein further described in detail.

In preparing the machine for operation, the hinged cover member 169 which closes the front end of the machine is first opened, and the control wheel 24 then manually adjusted to selectively position one of the pockets 78 with its open end in substantially opposed relation to the concave face 74 of the work rest 66, in accordance with the particular size or diameter of the work piece to be ground. Assuming that the cams 118 and 120 are in any chance position relative to the switches 132 and 140, the said cams are adjusted relative to each other as above explained. The proper spacing of these cams is determined by the following considerations.

The cam 118 is positioned so that its point of contact with the acutating member 130 for switch 132 coincides with the beginning of the forward feeding and grinding rotation of the control wheel 24. The space between the cams 118 and 120 must be such that the travel between the point of contact of cam 118 with switch operating member 130 and the point of contact of cam 120 with the switch operating member 138 is substantially equal to the amount of rotation of the control wheel required to feed the work piece to the work rest surface 76 and to grind said work piece. Also the adjustment of these cams must be such that the contact of cam 120 with switch operating member 138 coincides with the end of the grinding operation and the beginning of the reverse or discharging operation of the control wheel 24, as in Figure 6. In order to facilitate the accurate setting of the cam members, the length of each work engaging arcuate peripheral surface of the wheel 24 plus the distance required to feed the work piece from the wheel pocket to grinding position may be predetermined in degrees of rotation. By providing the face of disk 92 with degree graduations, the two cam members may be thus quickly adjusted to properly control and limit the extent of rotation of the control wheel 24 in the grinding operation, in accordance with the particular peripheral surface section of the wheel which is selected to cooperate with a work piece of a particular size.

Referring again to Figure 1 of the drawings, the pocket 78 in the control wheel 24 which is of the smallest size only receives and feeds a work piece to the upper surface of the work rest or support 66 and does not function to discharge the finished work piece from the machine. In addition to the pockets 78 the wheel is also provided with a pocket 79 which functions only as a discharging pocket for a finished work piece and is not used for receiving and feeding the work piece to grinding position. Also the peripheral surface of the wheel between this pocket and the pocket 78 of smallest area is not used for controlling the rotation of a work piece in the grinding throat. The arcuate length of each of the other peripheral surfaces 84 of the wheel 24 is accurately calculated in accordance with the diameter of the work piece to be received in the pocket 78 at the leading end of the peripheral surface so that in the grinding operation the work piece, regardless of its diameter, will be rotated upon the surface 76 of the work rest 66 for slightly more than one complete revolution.

With more particular reference to Figure 7 of the drawings, in which we have diagrammatically illustrated the control circuits for the operating motor 106, the operation of the machine is started by depressing button 170. A circuit is thus closed from the positive side 172 of the power line through the overload circuit breaker 174, stop button 176, start button 170 and thence through line 178, energizing the low voltage relay 180 and returning through line 182 to a point 183 on the negative side 184 of the power line.

The energization of relay 180 closes contact 186 and 188. Contact 186 closes a circuit from the junction point 190 through contact 186 to the junction point 192. Thus a holding circuit is established for the low voltage relay 180 when pressure upon the start button 170 is released. The contact 188 completes the main power line circuit to the motor starter.

Assuming that operation of the machine has been started with the cams 118 and 120 properly adjusted but with neither cam in contact with a switch operating member 130 or 138, respectively, the switches 132 and 140 are closed on the respective supply lines 194 and 196. A circuit is thus established from the point 198 on line 172, through contact 200, switch 132, line 194 and relay 202 to point 204 on line 184. Energizing of relay 202 closes contact 206 and establishes a second circuit from the point 198 on line 172, through contact 208, switch 140, line 196, contacts 206, 210 and 212, and relay 214 to the point 216 on line 184.

Relay 214 closes contact 218 and provides a closed circuit from point 198 on line 172 through contact 200, line 220, contact 218, lines 222, 224 and 226, contact 228 and relay 230 to point 232 on line 184. When relay 230 is energized contact 212 is opened, thus breaking the circuit 198—208—140—196—206—210—212—214 and 216. The closing of contact 234 at relay 230 establishes a holding circuit maintaining current supply to relay 230 independently of relays 202 and 214, namely, 198, 208, 140, 196, 234, 224, 226, 228, 230 and 232.

Relay 230, when energized, also operates to reverse the positions of the contacts 236 and 238 to close the forward motor starter circuit and drive the cam wheel or disk 92 in a counterclockwise direction as illustrated in Figure 4.

Assuming that the cam 118 at the start of rotation of the cam wheel was located outside of the arc between switch operating members 130 and 138, the cam surface 127 will actuate switch operating member 130 of switch 132, and provide a more direct circuit for energizing relay 230 from point 198 to contact 200, switch 132, lines 224 and 226, contact 228 and relay 230 to point 232. Thus the rotation of shaft 30 and cam wheel 92 continues in the counterclockwise direction, and cam 118 is moved to the position shown in Figure 4 which brings the control wheel approximately to the position shown in Figure 3.

Figure 3:
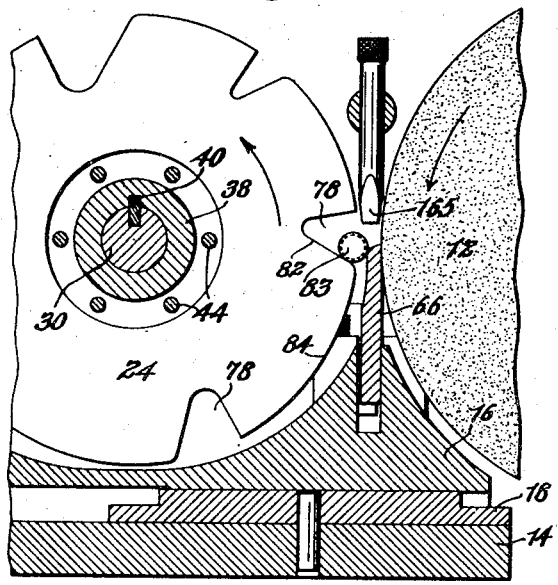
Figure 3 is a fragmentary sectional view taken substantially on the line 3—3 of Figure 2, showing the parts in position for feeding a work piece to grinding position on the work rest.

In Figure 3 the work piece 83 has been inserted into the selected pocket 78 of the control wheel and is being moved upwardly in the rotation of the control wheel 24, over the surface 74 of the work rest 66 by the side face 82 of said pocket, into grinding position on the inclined top surface 76 of the work rest, and against the periphery of the grinding wheel 12. In this movement of the work piece to grinding position, the threads thereon will be first engaged by the work locating finger 165 so that the work piece will be properly positioned to cause its threads to accurately mate with the grooves between the ribs 25 on the periphery of the grinding wheel 12. Further rotation of the control wheel in the anti-clockwise direction brings the peripheral surface section thereof extending below the pocket into contact with one side of the work piece 83 so that the latter is simultaneously rotated and urged against the grooved face of the grinding wheel 12.

As above stated the arcuate peripheral surface section of the control wheel 24 is of such length as to rotate the work piece through slightly more than one revolution, at which time, the required amount of stock is removed from the work piece by the grinding wheel to provide a finished work piece accurately ground to the final predetermined diameter. At this time, the control wheel 24 is approximately in the position shown in Figure 5 with respect to the work piece and further rotation in the anti-clockwise direction from this position, releases the work piece so that it rolls by gravity from the inclined upper surface 76 of the work rest into the following pocket 78 of the control wheel. The position of the cam wheel or disk 92 and the cams thereon at this time is shown in Figure 6 of the drawing, where it will be noted that cam 120 has engaged and actuated the operating member 138 for the switch 140 and the operation of motor 106 is reversed to rotate the shaft 30 and the control wheel 24 in the clockwise direction as indicated by the arrow in Figure 6.

When the switch 140 is thus operated, the previously established circuit to rotate the control wheel in the anti-clockwise direction through said switch and the line 196 (Figure 7) is broken. This de-energizes the relay 230 so that operation of the motor 106 is stopped. At the same time, switch 140 closes the circuit from the point 198 through contact 208 and line 252, contact 254 of relay 230 through relay 256 to point 258 on line 184. The energization of relay 256 closes contact 260 and establishes the following circuit: 198, 200, 132, 194, 260, 254, 256 and 258. This circuit energizes relay 256 independently of the cam switch 140 and thus establishes a holding circuit for relay 256, as the switch 140 is again opened when cam 120 releases the switch operating member 138.

Figure 6:
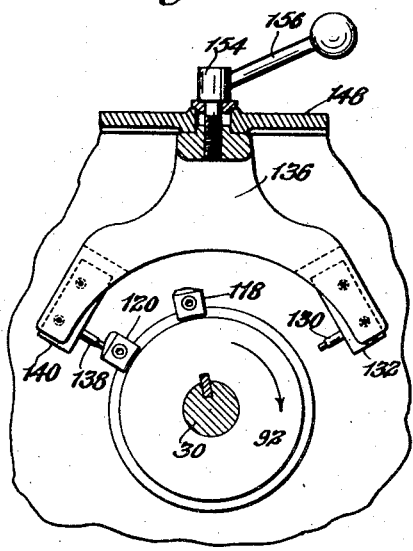
Figure 6 is a fragmentary sectional view similar to Figure 4, with the parts in substantially corresponding position to Figure 5.

The energization of relay 256 reverses the positions of contacts 262 and 264 to close the reverse drive starter circuit for motor 106 and oscillate the work control wheel 24 in the clockwise direction as in Figure 6. The control wheel will thus be returned approximately to the position of Figure 3 and the finished work piece 83 in the discharge pocket of the control wheel will be carried downwardly to a point near the bottom of the wheel, from which position it may be easily withdrawn, either by hand or by means of an automatic ejecting device of any suitable type now well known in this art.

The clockwise rotation of the wheel or disk 92 on the control wheel shaft, eventually causes the cam surface 126 to engage and actuate operating member 130 of the switch 132 thus breaking contact between said switch and the line 194 and opening the circuit 198, 200, 132, 194, 260, 254, 256, 258. The deenergization of relay 256 stops the motor 106 and permits the reclosing of contact 228 and reestablishes the circuit 198, 200, 132, 224, 226, 228, 230, 232. Relay 230 being again energized, closes the circuit 198, 208, 140, 196, 234, 224, 226, 228, 230, 232. Thus the motor is again operated in the forward direction to rotate the control wheel 24 in a counterclockwise direction and feed a new work piece to grinding position on the work rest 66 as above described.

When it becomes necessary to dress or true the peripheral surface of the control wheel, it is desirable to rotate said wheel continuously in one direction at a somewhat greater rate of speed than that used in the grinding operation, which is relatively slow. This is accomplished without disturbing the adjustment of the cams 118 and 120 by manually moving the bracket 136 (Figure 2) from the position in which switch operating members 130 and 138 are disposed in the path of movement of said cams in a rearward direction until the lug 160 of said bracket actuates the operating member 164 for switch 166 and closes said switch. From reference to Figure 7, it will be noted that such closure of the switch 166 establishes a circuit from the junction point 266 on line 172 through overload relay 174, line 268, switch 166, relay 270 and line 272 to point 274 on line 184. The energization of relay 270 reverses the positions of contacts 276, 200 and 208. Thus, both the forward and reverse motor driving circuits are opened and the following wheel dressing circuit is established: 198, 276, line 278, 224, 226, 228, 230, 232. This circuit energizes relay 230 so that the motor will be driven in the forward direction as heretofore described.

From the above description, it will be seen that we have provided a comparatively simple means for automatically operating the oscillatable work control wheel of a centerless grinding machine and electrically controlling such operation to variably limit the oscillating motions of said wheel in each direction in accordance with the particular size or diameter of the work pieces being ground. In the accompanying drawings, we have shown a work control wheel of a particular construction with one desirable arrangement of the work receiving and discharging pockets. However, it is to be understood that this is not essential, and the novel features of the present invention may be advantageously employed in connection with work control wheels of various other structural forms.

Referring now to Figures 8 to 11 of the drawings, we have shown an alternative embodiment of our invention, in which an alternating current motor is employed for the purpose of continuously rotating the control wheel during the truing operation while hydraulically actuated means is provided for oscillating the work control wheel during the grinding operation. The means whereby one of the wheel operating means may be substituted for the other, is in many respects similar to that described in the co-pending patent application above identified.

In this embodiment of the invention, the construction and mounting of the control and grinding wheels and the work rest and control wheel adjusting slides is substantially the same as that heretofore described.

However, in this embodiment of our invention, in place of the cam disk or wheel 92, a belt sheave 300 is affixed to the rear end of the control shaft 30 by means of the key 302 and lock nut 304. Also at the forward end of the shaft 30, the control wheel mounting collar 306, which corresponds to the collar 42 in Figure 2, is formed with a forwardly extending hub portion 308 surrounding the wheel locking nut 46 on the end of the shaft 30. The end of this hub is formed with a plurality of circumferentially spaced slots or recesses 310.

The cover or closure 312 for the front end of the control head 22 is provided with a cylindrical opening 314 axially aligned with the shaft 30. This opening contains a bushing 316 in which a short shaft 318 is journalled. To the rear end face of this shaft, a radially disposed clutch lug 320 is securely fixed by the screw 322. This clutch lug is adapted for engagement in any one of the slots or recesses 310 to thereby connect the shaft 318 with the shaft 30 for unitary rotation.

To the front face of the cover 312, a housing 324 is securely fixed by means of the screws 326, the front side of said housing being closed by the upper and lower cover members 328 and 330, respectively. These cover members are suitably secured to the housing wall by the screws indicated at 332 and 334. The lower cover member 330 has a cylindrical opening 336 which is axially aligned with the shaft 318 and control wheel spindle or shaft 30. In the opening 336 a flanged bushing 338 is secured by the screws 340. This bushing is provided with a helical slot 342 extending around substantially 180° of the circumference of said bushing. A shaft 344 journalled in the bushing 338 is provided with a radially protruding pin or stud 346 which is engaged in the slot 342 of said bushing. The rear end of the shaft 344 is of reduced diameter and terminates in a head 348 disposed in a recess provided in the forward end of the shaft 318 and retained therein by means of the two-part cover plate 350 (Figure 8). The end of the shaft 318 is of enlarged diameter and formed with the peripheral gear teeth 352, said enlarged end of the shaft being recessed to receive the cover plate 350 which is fixed in position by the screws 354. These screws also rigidly secure a radially projecting arcuate shaped plate 356 to the rear face of the enlarged end of shaft 318, the purpose of which will presently appear.

A cam member 358 is secured to the forward end of the shaft 344 and provided with the operating handle 360. This cam is of general triangular shape and has a cam surface 362 and a flat surface 364. The key 365 restrains the cam against independent rotation on shaft 344 and it is confined against axial movement relative to the shaft between a shoulder thereon and the nut 368.

A follower 370 is vertically movable through openings in the top and bottom walls of the cover section 330 and is yieldingly urged upwardly into contact with the cam 358 by the spring 372 interposed between the bottom wall of the cover member 330 and a shoulder on the follower. The follower is provided with a cam surface 374 which engages and operates the actuating member or plunger 378 of the switch 376 which is suitably mounted upon an enlargement 380 of the rear wall of the housing 324.

It will be evident from the above description that when the handle 360 is moved in an anti-clockwise direction from the position shown in Figure 13, shaft 344 is rotated to cause the pin or stud 346 to coact with the cam slot 342 in the bushing 340 and impart an axial outward movement to the shaft 318, thus disengaging the clutch lug 320 from the slot or recess 310 in collar 316. Simultaneously, the cam surface 362 acts on the upper end of the follower 370 to urge the same downwardly against the resistance of spring 352 and actuate the switch member 378 to circuit closing position. An alternating current motor connected by suitable transmission mechanism and a drive belt with the sheave 300, is thus energized to drive the shaft 30 and control wheel 24 at high speed in one direction for the purpose of truing or dressing the peripheral surface of the wheel.

When the control wheel 24 is to be operated for the purpose of grinding the work, the handle 360 is returned to the position of Figure 13, thus opening the motor control switch 376 and again connecting the shaft 318 with the shaft 30 of the control wheel for unitary rotation. In this embodiment of the invention, we provide a hydraulically actuated means for oscillating the control wheel, which will now be described with particular reference to Figures 8, 9 and 10 of the drawings.

The plate 356 is provided with an arcuate slot 382 and the camming members 384 and 386 are adjustably secured to the plate 356 by means of the screws 388 passing through the slot 382 and having nuts 390 threaded thereon. These camming members are adapted to engage the plungers or operating members 392 and 394, respectively, of the limit switches 396 and 398 which are removably secured by means of screws 400 to the rear wall of the housing 324. The function and purpose of these limit switches will be later more fully described.

The part 380 of housing 324 is provided at its upper end with a horizontal cylindrical bore 402, the end of this bore facing the grinding wheel 12 is closed by a suitable sealing member 404 to prevent the entrance of grinding grit and other extraneous matter to said bore. This bore slidably receives the cylindrical member 406 provided on the upper side thereof with rack teeth 408 which are in mesh with the teeth 352 formed on the enlarged end of shaft 318. Since the plate 356 is rigidly secured to the shaft 318, it will be seen that reciprocation of the rack member 406 will cause oscillatory movement of the plate 356 so that the cam members 386 and 384 carried thereby will alternately actuate the switches 396 and 398, respectively.

The reciprocation of rack member 406 is effected by means of a piston 410 (Figure 11) operating in the cylinder 412 and connected to the rack member 406 by the piston rod 414. Cylinder 412 is suitably secured to one side of the housing 324 by means of the screws indicated at 416 (Figure 8).

The cover 312 is preferably hinged to the control head 22 so that said cover with the mechanism mounted thereon may be swung out of the way to permit manual adjustment of the control wheel 24 for selectively positioning the pockets 78 thereof with respect to the work rest 66.

The automatic control of the hydraulically actuated operating means for the work control wheel 24 is preferably accomplished by means of the electrical control system diagrammatically illustrated in Figure 11 of the drawings. Referring thereto, the operation is started by operating pump 460 by means of a suitable motor (not shown) so that hydraulic pressure will be built up in the line 462 to close the pressure actuated switch 464 in the electrical circuit.

The three phase alternating current electrical system shown in Figure 11 comprises the main lines 466, 468 and 470, with the operating relays installed between lines 466 and 468. When the start button 472 is depressed, a circuit is momentarily established from point 474 on line 466 through the low voltage relay 476, start button 472, stop button 478, overload circuit breaker 480 and fluid pressure actuated switch 464 to point 482 on line 468. Relay 476 when thus energized closes the contacts 484, 486. Contact 484 closes a holding circuit for the maintenance of current through the relay 476 when pressure on the start button 472 is released. Contact 486 is inserted in the main line 468 for low voltage protection. It will be noted that relay 490 is connected with the power line 466 and with line 468 through the connecting line 488.

The relay 490 remains energized as long as the circuit through relay 476 is closed and switch 376 is closed on line 468. Therefore contacts 492, 494 and 496 are retained in closed position. However, the motor 498 will not be started until the switch 376 is closed by the cam follower 370, as above explained for the purpose of continuously driving the control wheel 24 at high speed in one direction during the dressing operation.

In the normal grinding operation of the machine the motor 498 is not used and switch 376 is not closed on the line 468 but on the line 500. A circuit is thus closed from point 502 on line 466 through the relay 504, normally open cam switch 398, line 500 and switch 376 to line 468. It is to be noted that when the machine is stopped, cam 384 is always in the position shown in Figure 10, that is, in contact with the operating member 394 for switch 398 so that said switch is held in closed position.

The energization of relay 504 closes the contacts 506, 508 so that a circuit is established from point 502 through relay 504, contact 506 normally closed cam switch 396, line 500 and switch 376 to line 468. Thus a holding circuit is established to maintain relay 504 energized when the cam 384 moves from the position shown in Figure 10 and the circuit 502, 504, 398, 500, 376, 468 is broken.

Another circuit is closed from point 510 on line 466 through the solenoid 512, contact 508, line 500 and switch 376 to line 468. When solenoid 512 is thus energized, it operates the slide valve 514, moving the same to the right against the action of spring 518 (see Figure 11). In this position of slide valve 514, the hydraulic fluid is drawn from a reservoir 520 by the pump 460 and forced through line 522 into the casing of valve 514, from which it flows through line 524 to the hydraulic cylinder 412 at the right hand end thereof, actuating piston 410 and moving rack member 406 to the left. In this movement of piston 410, fluid is exhausted from the left end of cylinder 412 through the line 528, line 530 being closed by the check valve 532. From line 528, the fluid passes through needle valve 534 which may be adjusted to regulate the rate of flow and consequently the rate of movement of rack 406 towards the left. The exhausted fluid continues through line 536, the casing of valve 514 and line 538 to the reservoir 520.

Referring now to Figure 10 of the drawings wherein the mechanism is in stopped position, with the cam 384 engaged with the operating member 394 of switch 398, it is apparent that the selected pocket 78 of the work control wheel 24 is in position to feed the work piece 84 upwardly to grinding position on the work rest 66, in the manner heretofore explained. Having started the operation of the machine as above described rack member 406 in its movement toward the left rotates gear 352 on the end of shaft 318 in a clockwise direction. Therefore through the clutch means shown in Figure 9, the control wheel 24 is also rotated in a clockwise direction so that the work piece 84 is first fed upwardly into contact with locating finger 165 which positions the same upon the top of the work rest 66 in contact with the peripheral ribbed surface of the grinding wheel 12, said work piece being then engaged and urged against the grinding surface of wheel 12 with a frictional braking action by the following peripheral surface section of the control wheel 24. Of course the contact members 384 and 386 are first relatively adjusted and spaced apart in the manner previously described so as to terminate this grinding operation of the control wheel in accordance with the diameter of the work piece and the length of the particular peripheral surface section of wheel 24 which coacts therewith. The work piece then drops into the following pocket of the control wheel and the several parts are then in the position shown in Figure 8 of the drawings.

Cam member 386 having been properly set actuates switch 396 immediately after the work piece falls from the grinding position into the control wheel pocket. Thus the normally closed switch 396 is opened and breaks the circuit 502, 504, 506, 396, 500, 376, 468. The relay 504 is thus de-energized, breaking the circuit 510, 512, 508, 500, 376, 468, which de-energizes the solenoid 512. Spring 518 then acts to move slide valve 514 towards the left. In this position of the slide valve, hydraulic fluid line 522 is connected with line 536 and fluid is forced through the check valve 532 into the left hand end of the cylinder 412, thereby forcing the piston 410 toward the right. Thus, the rack bar 406 is moved towards the right, the direction of rotation of control wheel 24 being reversed and moving in an anti-clockwise direction from the position shown in Figure 8 to that shown in Figure 10 and discharging the finished work piece from the machine in the manner above described. Of course, in this operation fluid is exhausted from the right hand end of cylinder 412 through the line 524, the casing of valve 514 and the line 552. Preferably, a valve 554 is provided for controlling and regulating the pressure of the fluid in the system.

From the foregoing description, it will be appreciated that our present invention essentially comprises an electrically or hydraulically powered means for automatically operating the oscillatory work regulating or control member of a centerless grinding machine together with means controlling the extent or degree of such oscillatory motion in the grinding operation in proportionate ratio to the size or diameter of the particular work piece being operated upon. Thus, although the present invention is of general utility in many industrial fields, it perhaps has its most important application to those cases in which highly accurate finish grinding is required, as in the grinding of roughly preformed screw threads on bolts, rods and other work pieces. While we find it most convenient to provide a simple electrical control system for the hydraulically or electrically actuated operating means for the work control wheel, such as those above described, our invention also contemplates the use of mechanically or fluid pressure operated means for this purpose.

It will be seen that by means of simple additions to the machine disclosed in the pending application above identified, involving moderate additional production costs, we have provided an automatic, highly efficient centerless grinding machine, capable of large volume quantity production of precision-finished work pieces. Particularly, in the grinding of threaded work pieces, our invention assures a high degree of accuracy and uniformity in the helix angle, pitch and final diameter and concentricity of the screw threads. The invention provides means for interchangeably connecting the work control wheel to the power means for the oscillatory grinding operation or for continuous rotation in one direction in truing or dressing its peripheral surface. In general, a machine constructed in accordance with either of the described embodiments of our invention provides a high capacity grinding machine of this type, the several parts of which are of simple and durable structural form, capable of expeditious and accurate assembly, and the production and maintenance costs of which will be reasonably low.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a centerless grinding machine, a grinding wheel and a work control wheel mounted to rotate about horizontally spaced axes in peripherally opposed relation to form a grinding throat, a member to support a work piece in the grinding throat, power means for optionally rotating said control wheel continuously in one direction or for imparting oscillatory rotation thereto, means controlling the operation of said power means, and manually operable means for conditioning said control means to effect continuous or oscillatory rotation of the work control wheel.

2. The centerless grinding machine defined in claim 1, in which the said controlling means for the power means includes an electric circuit having a normally open switch therein adapted to be operated to closed position by said manually operable means for continuous rotation of the work control wheel in one direction.

3. In a centerless grinding machine, a grinding wheel and a work control wheel mounted to rotate about horizontally spaced axes in peripherally opposed relation to form a grinding throat, a member to support a work piece in the grinding throat, said control wheel having work receiving and discharging means, a reversible operating motor for the work control wheel, and electrical control means for said motor including means connected with and actuated by the control wheel to impart limited oscillatory rotation to said work control wheel and first control and limit rotation of the work piece against the peripheral face of the grinding wheel and then discharge the ground work piece from the machine.

4. The centerless grinding machine defined in claim 3, in which said motor control means includs relatively adjustable circuit closing members to variably predetermine the degree of oscillatory motion of the work control wheel in accordance with the diameter of the work piece.

5. The centerless grinding machine defined in claim 3, in which said motor control means includes spaced circuit closing switches, a member mounted in fixed relation with the work control wheel, and relatively adjustable cams mounted on said member to actuate the respective switches at predetermined times and variably limit the degree of oscillatory rotation of the control wheel in proportionate ratio to the diameter of the work piece.

6. In a centerless grinding machine, a grinding wheel and a work control wheel mounted to rotate about horizontally spaced axes in peripherally opposed relation to form a grinding throat, a member to support a work piece in the grinding throat, a reversible operating motor for the work control wheel, and electrical control means for said motor including spaced switches controlling the operation of the motor in reverse directions, and an additional switch controlling continuous operation of the motor in one direction, a member mounted in fixed relation with the work control wheel, relatively adjustable cams mounted on said member to actuate the respective spaced switches in predetermined timed relation and reversibly operate the motor to impart oscillatory rotation to the work control wheel, and a member supporting said spaced switches and manually operable to dispose the said switches out of the path of movement of said cams and to simultaneously actuate said additional switch to circuit closing position for the continuous operation of said motor and the work control wheel in one direction.

7. In a centerless grinding machine, a grinding wheel and a work control wheel mounted to rotate about horizontally spaced axes in peripherally opposed relation to form a grinding throat, a member to support a work piece in the grinding throat, hydraulically actuated means for operating the work control wheel, and means responsively controlled by the work control wheel for automatically controlling the operation of said hydraulically actuated means to effect limited rotation of the work piece against the peripheral face of the grinding wheel by contact of a minor peripheral surface section of the work control wheel with the work piece.

8. The centerless grinding machine defined in claim 7, in which said control means includes adjustable means variably controlling the operation of said hydraulically actuated means to selectively predetermine the circumferential extent of said peripheral surface of the control wheel having effective engagement with the work piece during the grinding operation, in proportionate ratio to the diameter of the work piece.

9. The centerless grinding machine defined in claim 7, in which said work control wheel has a plurality of circumferentially spaced peripheral surface sections of relatively different lengths adapted to be selectively positioned to engage a work piece on said supporting member.

10. The centerless grinding machine defined in claim 7, in which said control means includes means for effecting oscillatory rotation of the work control wheel by said hydraulically actuated means, and wherein said wheel is provided with means for discharging the ground work piece from the machine in its oscillatory motion in one direction.

11. The centerless grinding machine defined in claim 7, in which said work control wheel is provided with a plurality of circumferentially spaced work receiving pockets connected by peripheral surface sections of relatively different lengths, adapted to be selectively positioned with respect to the work support, and wherein said means for controlling the hydraulically actuated means includes means for variably limiting rotative movement of the work control wheel in accordance with the linear extent of the selected surface section thereof having effective contact with the work in the grinding operation.

12. In a centerless grinding machine, a grinding wheel and a work control wheel mounted to rotate about horizontally spaced axes in peripherally opposed relation to form a grinding throat, a member to support a work piece in the grinding throat, hydraulically actuated means for operating the work control wheel, and electro-mechanically operated control means for said hydraulically actuated means, and means for governing the operation of said control means including means adjustably connected with and operated by said work control wheel to variably predetermine the time period of effective operation of said hydraulically actuated means, and effect limited rotation of the work piece against the peripheral face of the grinding wheel by contact of a minor peripheral surface section of the work control wheel with the work piece.

13. In a centerless grinding machine, a grinding wheel and a work control wheel mounted to rotate about horizontally spaced axes in peripherally opposed relation to form a grinding throat, a member to support a work piece in the grinding throat, hydraulically actuated means for oscillating the work control wheel, electro-mechanically operated control means for said hydraulically actuated means, responsively controlled by said work control wheel, to effect limited rotation of the work against the peripheral face of the grinding wheel by contact of a minor peripheral surface section of the work control wheel with the work piece, an operating motor to rotate the work control wheel continuously in one direction, a circuit therefor, a switch normally closing an energizing circuit for said electro-mechanically operated control means, and manually actuated means for operating said switch to open the latter circuit and to close the energizing circuit for said motor.

14. In a centerless grinding machine, a grinding wheel and a work control wheel mounted to rotate about horizontally spaced axes in peripherally opposed relation to form a grinding throat, a member to support a work piece in the grinding throat, power operated means for reversibly rotating said work control wheel, and means operatively controlled by the work control wheel automatically responsive to a predetermined degree of rotation of said wheel in effective contact with the work piece, to control the operation of said power operated means and cause said means to rotate the work control wheel to the same degree in the opposite direction.

15. The centerless grinding machine defined in claim 14, in which said last-named means includes adjustable means synchronously movable with the work control wheel to variably predetermine the degree of effective rotation of the control wheel during the grinding operation in proportionate ratio to the diameter of the work piece.

16. The centerless grinding machine defined in claim 14, in which said power operated means is electrically energized.

17. The centerless grinding machine defined in claim 14, in which said power operated means is hydraulically energized.

18. In a centerless grinding machine, a grinding wheel and a work control wheel mounted to rotate about horizontally spaced axes in peripherally opposed relation to form a grinding throat, a work support in the grinding throat, a reversible motor operatively connected with the control wheel, electrical control means including spaced switches controlling operation of the motor in reverse directions to oscillate the control wheel, and operating members individual to the respective switches, adjustably mounted in fixed relation with the control wheel, and actuated thereby to operate said switches and impart a predetermined degree of oscillatory motion to the control wheel.

19. In a centerless grinding machine, a grinding wheel and a work control wheel mounted to rotate about horizontally spaced axes in peripherally opposed relation to form a grinding throat, a work support in the grinding throat, reversibly operable power means for oscillating the control wheel, and means governing the operation of said power means to impart a low speed oscillation to the control wheel in one direction to grind the work and a relatively high speed oscillation in the opposite direction.

20. The centerless grinding machine defined in claim 19, in which said reversible power means includes a hydraulically operated motor and said governing means comprises a metering valve in the hydraulic circuit.

21. In a centerless grinding machine, a grinding wheel and a work control wheel mounted to rotate about horizontally spaced axes in peripherally opposed relation to form a grinding throat, a work support in the grinding throat, reversibly operable power means for oscillating the control wheel, separate power means for continuously rotating the control wheel in one direction, and electrical control means for each of said power means including switch means manually operable to energize either of said power means independently of the other.

22. The centerless grinding machine defined in claim 21, in which the reversible power means includes a hydraulically operated motor and said separate power means is an electric motor.

23. In a centerless grinding machine, a grinding wheel and a work control wheel mounted to rotate about horizontally spaced axes in peripherally opposed relation to form a grinding throat, a member to support a workpiece in the grinding throat, an operating motor for said control wheel, and means controlling the operation of said motor including an electric circuit and switch means in said circuit, switch actuating members connected with the control wheel for unitary movement therewith, and means for adjusting said members relative to each other and to the switch means to variably predetermine the time period of energization of said motor and limit the rotation of the control wheel by said motor in predetermined ratio to the diameter of the workpiece.

24. In a centerless grinding machine, a grinding wheel and a work control wheel mounted to rotate about horizontally spaced axes in peripherally opposed relation to form a grinding throat, a member to support a workpiece in the grinding throat, an operating motor for said control wheel, and means controlling the operation of said motor including co-acting members governing the effective operation of said control means, and means adjustably connecting one of said members to the control wheel for unitary movement therewith to variably predetermine the degree of rotation of the control wheel in effective engagement with the workpiece, in proportionate ratio to the diameter of the workpiece.

CECIL W. HOPKINS.
EDWIN M. EIGENBRODE.

REFERENCES CITED

The following references are of record in the file of this patent:

UNITED STATES PATENTS

| Number | Name | Date |
|---|---|---|
| 1,814,351 | Theler | July 14, 1931 |
| 1,850,054 | Strickland et al. | Mar. 15, 1932 |
| 2,025,714 | Binns | Dec. 31, 1935 |
| 2,029,510 | Steiner et al. | Feb. 4, 1936 |
| 2,088,737 | Forbes | Aug. 3, 1937 |
| 2,091,655 | Scrivener | Aug. 31, 1937 |
| 2,346,851 | Lloyd | Apr. 18, 1944 |

FOREIGN PATENTS

| Number | Country | Date |
|---|---|---|
| 364,312 | Great Britain | Jan. 7, 1932 |